(12) United States Patent
Kusey et al.

(10) Patent No.: US 6,408,568 B1
(45) Date of Patent: Jun. 25, 2002

(54) COMPRESSED BLENDS OF COCONUT COIR PITH AND A NON-COIR/NON-PEAT MATERIALS, AND PROCESSES FOR THE PRODUCTION THEREOF

(75) Inventors: William E. Kusey, Richwood; Mark Yelanich, Columbus, both of OH (US)

(73) Assignee: OMS Investments, Inc., Wilmington, DE (US)

( * ) Notice: Subject to any disclaimer, the term of this patent is extended or adjusted under 35 U.S.C. 154(b) by 0 days.

(21) Appl. No.: 09/768,169

(22) Filed: Jan. 23, 2001

(51) Int. Cl.⁷ ............................ C09K 17/52; A01G 1/00
(52) U.S. Cl. ............................................................ 47/9
(58) Field of Search ................................. 47/9, 63, 64

(56) References Cited

U.S. PATENT DOCUMENTS

| | | | |
|---|---|---|---|
| 5,458,662 A | 10/1995 | Toyone | |
| 5,839,674 A | 11/1998 | Ellis | |
| 6,189,260 B1 | * 2/2001 | Kusey et al. | ............ 47/9 |

FOREIGN PATENT DOCUMENTS

| | | | |
|---|---|---|---|
| DE | 2028664 A | | 12/1971 |
| DE | 3800078 A1 | * | 7/1988 |
| EP | 0041950 B1 | | 8/1984 |
| FR | 9208050 A1 | | 12/1993 |
| GB | 2137609 A | | 10/1984 |
| GB | 2308538 A | * | 7/1997 |
| JP | 052772 | | 9/1990 |
| JP | 03063316 A | | 3/1991 |
| JP | 04126014 A | | 4/1992 |
| JP | 125642 | | 5/1994 |
| JP | 181629 | | 7/1994 |
| JP | 407308120 A | | 11/1995 |
| JP | 409313049 A | | 12/1997 |
| JP | 11018566 A | | 1/1999 |
| JP | 11056095 A | | 3/1999 |
| JP | 11-155309 | * | 6/1999 |
| NL | 7508255 A | | 7/1975 |
| RU | 987222 | | 2/1982 |
| RU | 1029922 | | 7/1983 |
| RU | 1053782 | | 11/1983 |
| WO | WO 94/12576 | | 6/1994 |
| WO | WO 99/42422 | | 8/1999 |

* cited by examiner

Primary Examiner—Peter M. Poon
Assistant Examiner—Jeffrey L. Gellner
(74) Attorney, Agent, or Firm—Jones, Day, Reavis & Pogue

(57) ABSTRACT

Compressed mixtures of blends of coconut coir pith and selected horticulturally acceptable non-coir/non-peat materials such as composted yard waste; composted bark; composted manure; sand; peat humus; composted agricultural waste; composted animal byproducts; treated sewage sludge; animal and/or vegetable-based landfill waste; wood and lignocellulose derivatives; vermiculite; perlite, glass beads; foamed plastics, and mixtures thereof are prepared in a manner such that, upon decompression, a total volume of decompressed coir pith and decompressed non-coir/non-peat material is produced which exceeds the sum of the initial volumes of coconut coir pith and non-coir/non-peat material in the blends.

37 Claims, No Drawings

COMPRESSED BLENDS OF COCONUT COIR PITH AND A NON-COIR/NON-PEAT MATERIALS, AND PROCESSES FOR THE PRODUCTION THEREOF

BACKGROUND OF THE INVENTION

1. Field of the Invention

This invention relates to blended soil-enhancing compositions in which coconut coir pith is combined with selected horticulturally acceptable non-coir pith, non-peat moss additive materials (hereinafter sometimes referred to as "non-coir/non-peat materials") and to processes for producing such compositions. The blended compositions can be compressed for sale as baled products, and subsequently decompressed to provide plant growth media having improved fluff yield and wettability characteristics as compared with coir pith and non-coir/non-peat additives which are compressed and fluffed separately.

2. Description of Related Art

Coconut coir pith is a by-product of the coconut husk fiber processing industry. Coir is the name given to the fibrous material that constitutes the thick mesocarp (middle layer) of the coconut fruit (*Cocos nucifera*) In processing, the long fibers of coir are extracted from the coconut husk for use in the manufacture of brushes, upholstery stuffing, filters, twine and like products. The short fibers (2 mm or less) and dust (collectively referred to herein as "pith") traditionally have accumulated in large piles or "dumps" as a waste product resulting from the processing of coconut husks to obtain the industrially valuable long fibers.

Coconut coir pith has a high lignin to cellulose, content which prevents oxidation and resultant shrinkage. Accordingly, these materials do not decompose rapidly, resulting in the "dumps" of material which have remained as accumulated waste for extended periods of time with essentially no industrial applicability other than for burning.

Relatively recently, it has been recognized that coconut coir pith material provides an excellent growing medium for plants and it has been suggested that coconut coir pith could provide an effective alternative to previously standard growing media such as peat moss. Coconut coir pith is very similar to sphagnum peat moss in appearance having a light to dark brown color and consisting primarily of particles in the size range of 0.2–2.0 mm (75–90%). Unlike sphagnum peat, however, there are no sticks or extraneous matter in the coconut coir pith. Furthermore, sphagnum peat moss has a density of about 7 lbs/cu ft when fluffed (30–50% moisture content) whereas coir pith is much denser (i.e., about 43 lbs/cu ft when compressed at a ratio of 5:1 on volume to volume (v/v) basis and about 25 lbs/cu ft when fluffed and having a 50–55% moisture content).

Additional analysis of coconut coir pith in comparison with sedge peat (also known as "Florida" peat) and sphagnum peat products has indicated that coconut coir pith has superior structural stability because of the high lignin to cellulose content of the pith which prevents oxidation and shrinkage as compared with peat moss which has a high cellulose to lignin content.

Normally, coconut coir pith to be used as a plant growth medium is prepared by collecting aged pith from existing waste dumps or newly processed pith and drying the material to a 20% moisture content and then compressing. the pith into bricks at a compression ratio of about 5:1 (v/v). These compressed bricks can then be expanded by adding water to achieve yields of about 7 volumes to each 1 volume input material at about 80% moisture content although some mechanical agitation is required in order to increase the output of the outturned coir pith. This mechanical agitation requirement presents a disadvantage in processing coir pith as it presents an inconvenience and expense for growers and other end users of the product. A further disadvantage in the processing of coir pith as a plant growth medium is that, unlike compressed bales of peat moss which can be readily fluffed or outturned to yield a desirable fluffed product, coir pith takes considerably more time to be fluffed or "outturned".

The foregoing disadvantages in the processing of coir have contributed to its lack of suitability as a replacement for peat moss. Accordingly, it has been well known in the art to combine peat moss and coir pith in a non-compressed form. Such non-compressed mixtures of coir and peat moss are produced by initially decompressing bricks of compressed coir pith and bales of compressed peat moss to provide separate fluffed coir pith and fluffed peat moss raw materials. Then, the already fluffed materials are mixed together for distribution as a "loose-fill" product containing the decompressed, fluffed mixture of coir pith and peat moss.

The fluffed products produced in this manner have been demonstrated to provide better media for growing plants than the media provided by coir pith or peat moss alone. However, it has been recognized previously that these "loose-fill" products are not advantageous for purposes of shipment and/or storage of the products and that more favorable methods for producing growing media containing these mixtures would be very beneficial and commercially significant.

The above-described processing difficulties observed with coir when used alone, as well as the commercial limitations of loose fill mixtures of non compressed coir and peat moss, were successfully addressed in co-pending, commonly assigned U.S. patent application Ser. No. 09/026,639 now U.S. Pat. No. 6,189,260, entitled "Compressed Mixtures of Coconut Coir Pith and Peat Moss and Processes for the Preparation Thereof", which application is incorporated herein by reference and made a part hereof. In addition to providing compressed mixtures of coir and peat moss which addressed the problems noted above, the '639 application disclosed that a surprising improvement in fluff yield can be achieved when coir pith and peat moss, under controlled moisture conditions, are first compressed to form a baled product, and then decompressed via fluffing or outturning for ultimate use as a growth medium. In particular, the commonly assigned '639 application disclosed that decompression of a compressed coir/peat moss blend yields a final volume of fluffed product that is unexpectedly greater than the sum of the individual volumes of coir and peat moss used to produce the initial pre-compressed blend.

Nevertheless, while the compressed coir/peat moss blends, and processes therefor, described in the co-pending '639 application represent a significant advance over the prior art, a known drawback in using peat moss is that the harvesting of this material can cause a gradual depletion of environmentally sensitive wetland ecosystems such as bogs and swamps. Moreover, considering the quantities of peat moss which are harvested annually to satisfy commercial demand, the material cannot properly be considered a renewable resource. Consequently, a high quality alternative to peat moss that is consistently available and also satisfies heightened environmental concerns has been recognized, heretofore, as being a desirable objective, in that it would benefit the environment to decrease the amount of harvested peat required for horticultural use.

In particular, it would be highly desirable if the peat moss component of the compressed coir/peat compositions (and processes) described in commonly-assigned U.S. Ser. No. 09/026,639 could be entirely or even partially replaced with other less expensive, readily available and renewable horticultural additives, without sacrificing the improved fluff yield or other beneficial properties which were achieved employing compressed coir/peat moss blends.

SUMMARY OF THE INVENTION

Accordingly, it is a primary object of the present invention to provide blended compositions containing mixtures of coconut coir pith and selected horticulturally acceptable non-coir/non-peat materials (both organic matter and inorganic) as compressed products suitable for sale in baled form and for subsequent decompression, for example, by fluffing and outturning.

A further object is to provide baled, compressed products containing mixtures of coconut coir pith and horticulturally acceptable non-coir/non-peat ingredients which can be readily decompressed (e.g., after shipment or storage) to provide higher than expected fluffed yields of the blended mixtures for use as growing media.

Another important object of this invention is to provide a process for preparing compressed mixtures of coconut coir pith and various non-coir/non-peat organic and/or inorganic ingredients derived from readily available materials such as composted animal or vegetable waste such as found in landfills and the like, composted yard waste, sand, perlite, vermiculite, and like non-coir/non-peat sources, which can be decompressed to provide an unexpectedly high volume of decompressed coir pith and non-coir/non-peat material when the compressed blend is decompressed.

The foregoing and other objects of the invention are achieved by providing a composition comprising a compressed blend of coconut coir pith and a non-coir/non-peat material, the compressed blend being prepared by admixing an initial non-compressed volume of coconut coir pith with an initial non-compressed volume of a horticulturally acceptable non-coir/non-peat material. The moisture content of the initial non-compressed coir pith in the admixture is less than about 25 weight percent. The moisture content of the initial non-compressed non-coir/non-peat material in the admixture is sufficient to enable the admixture to be compressed to form the compressed blend of the coir pith and the non-coir/non-peat material in a manner such that, upon decompression of the compressed blend, a total volume of decompressed coir pith and non-coir/non-peat material is produced which exceeds the sum of the initial non-compressed volumes of coconut coir pith and non-coir/non-peat material in the admixture.

Examples of horticulturally acceptable non-coir/non-peat materials or ingredients for admixture with coconut coir pith in the blends of the present invention include, by way of example and not by way of limitation, composted yard waste; composted bark; composted manure; peat humus; composted agricultural waste; composted animal byproducts; treated sewage sludge; animal-and/or vegetable-based landfill waste; vermiculite; perlite; glass beads; foamed plastics, and mixtures thereof In accordance with the present invention, the blended compositions are produced as compressed products ready for sale in baled form rather than as decompressed, fluffed products. In particular, we have discovered that by mixing non-compressed coir pith with one or more non-compressed horticulturally acceptable non-coir/non-peat ingredients and subjecting the resulting non-compressed mixture to a compression step, a new and improved compressed product is achieved which later can be subjected to a final decompression or fluffing step to result in a final volume of decompressed material that is greater than the volume of the initial combination. For example, if one unit volume of non-compressed coir is combined with one unit volume of a selected non-compressed non-coir/non-peat ingredient (or mixture thereof), followed by compression at a ratio in a range of about 1.5 to about 2.5 to 1, and then decompression to provide a fluffed or outturned product, the final decompressed, fluffed/outturned volume is greater than the initial two-unit volume of the starting combination. This is particularly surprising in that compression and decompression of coir, by itself, results in a final decompressed yield which is smaller than the initial decompressed coir volume. A similar reduction in volume yield is observed when a non-coir/non-peat ingredient is compressed and decompressed by itself.

In a preferred embodiment of this invention, the coconut coir pith component of the admixture is initially provided in the form of compressed bricks and the selected horticulturally acceptable non-coir/non-peat material to be combined therewith is provided in the form of compressed bricks or bales. Then, the separate compressed coir pith and non-coir/non-peat ingredients are subjected to an initial decompression step whereby separate non-compressed quantities. of coir pith and non-coir/non-peat-based ingredients are produced. The resulting non-compressed coir pith and non-coir/non-peat ingredients are then admixed and compressed to produce compressed bales suitable for sale and distribution as baled products capable of being subsequently decompressed (i.e., fluffed or outturned) for horticultural use to produce a final aggregate volume of the decompressed coir pith and non-coir, non-peat materials that is greater the sum of the initial, non-compressed volumes of the separate coir pith and non-coir/non-peat materials prior to compression to produce the compressed blend.

A preferred process for producing the compressed blends of coconut coir pith and non-coir/non-peat material in accordance with the present invention comprises the steps of: providing an initial non-compressed volume of coconut coir pith having a moisture content of less than about 25 weight percent and providing an initial non-compressed volume of a horticulturally acceptable non-coir/non-peat material. Then, admixing the initial non-compressed volume of coconut coir pith and the initial volume of non-compressed non-coir/non-peat material to provide a blend. The resulting blend is subjected to a compression step to form a compressed blend of coir pith and non-coir/non-peat material. The moisture content of the initial non-compressed non-coir/non-peat material incorporated in the blend, is sufficient to enable formation of the compressed blend in a manner such that, upon decompression of the compressed blend, a mixture of the coir pith and the non-coir/non-peat material is produced having a total volume which exceeds the sum of the initial non-compressed volumes of coconut coir pith and non-coir/non-peat material in the admixture.

In a further aspect, the present invention provides a composition comprising a compressed blend of an initial volume of non-compressed coconut coir pith an initial volume of one or more horticulturally acceptable non-coir/non-peat materials; wherein the compressed mixture is able to provide an increased fluff yield of the coconut coir pith and the non-coir/non-peat material when the compressed blend is fluffed or outturned.

As used in the present invention, the term "non-coir" as applied to a component of the blends of the present invention is intended to denote an ingredient which is essentially free of coir pith but is not intended to exclude trace amounts of coir which may be present, e.g., as residue from other manufacturing operations, but which provide no material horticultural effect. As used herein, the term "non-peat" when used to describe a horticulturally acceptable additive material to be combined with coir pith, is intended to denote an ingredient which is essentially free of peat moss, but is not intended to exclude trace amounts thereof which may be present, e.g., as residue from other manufacturing operations, but which provide no material horticultural benefit; nor is it intended to exclude composted peat moss (i.e., peat humus). Moreover, while the total elimination of peat moss-based products is preferred in the present invention for environmental reasons, the invention also encompasses the presence of peat moss as an optional third ingredient to be mixed with the other two ingredients of the invention; i.e, the coir pith ingredient, and the non-coir/non-peat ingredient. In regard to commonly-assigned U.S. Ser. No. 09/026,639 (directed to compressed coir/peat moss blends), the present invention is not intended to cover blends which, apart from relatively minor amounts of nutrient ingredients or other minor additives, consist essentially entirely (by volume) of coir and peat moss.

DETAILED DESCRIPTION

We have discovered new and improved processes which enable the production of new and improved products comprising compressed mixtures of coir pith and a variety of soil enhancing non-coir/non-peat ingredients (both organic and inorganic) which can be shipped or stored in-compressed bales but are capable of being fluffed or "outturned" to provide decompressed mixtures having unexpectedly high fluff yield rates. The products of this invention are useful in a wide variety of horticultural applications and, most particularly, as soil additives and substrates for growing plants.

Standard compressed bricks of coir pith and compressed bales (or bricks) of non-coir/non-peat soil additives, normally, are employed as raw materials in the process of the present invention for producing compressed blends or mixtures of the coconut coir pith and non-coir additives. However, the process of the present invention may employ already decompressed coir pith and/or non-coir/non-peat additives as starting materials, if such raw materials are available, and an initial decompression stage of the process may be eliminated in whole or in part.

Preferably, compressed coir pith bricks to be used in the present process have been dried to a moisture content of about 20% and have been compressed at a ratio of at least 5:1 (v/v). Compressed bales (or bricks) of non-coir/non-peat ingredients to be employed in the process may be formed from any of a variety of the types of horticulturally acceptable materials heretofore used in home and commercial agricultural and horticultural applications. In a further preferred embodiment, the non-coir/non-peat material is screened prior to compression to remove oversized materials and then compressed at a ratio in a range of about 1.5:1 to about 2.5:1 (v/v). The compression ratio will depend on the type of material employed.

The horticulturally acceptable, non-coir/non-peat ingredient may be selected from organic matter, inorganic matter, or combinations thereof. As used herein, the terms "organics", "organic matter", "organic materials" and the like are intended to denote any type of non-coir/non-peat vegetable and/or animal organic materials suitable for use as a plant growth medium.

Examples of organic matter suitable for use in the present invention include composted yard waste (e.g., composted grass clippings, leaves, mulch, hedge trimmings and the like); wood and lignocellulose derivatives (e.g., wood chips, wood pulp such as fluffed pulp, extruded wood, pressure treated wood and the like); composted bark (e.g., pine bark and other barks); agricultural waste products such as the remnants produced, for example, during harvesting of grains and beans including materials such as straw and grain husks; animal waste products such as cattle, pig, chicken and/or horse manure; livestock processing by-products such as blood meal and the like; organic waste materials resulting from treated municipal sewage sludge; organic waste materials resulting from treated landfill materials comprising residential and commercial food, paper and yard waste.

Examples of the foregoing types of organic plant growth-media, and processes for obtaining them, are well known in the art. In this regard, reference may be had to publications such as those included in U.S. Pat. Nos. 4,088,528; 4,185,680; 5,269,634; 5,413,618; 5,542,962; 5,567,220; 5,976,211; 5,900,038; European Patent EPO 923 854; and PCT applications WO 99/57079 and WO 99/57080, all of which are incorporated herein by reference.

The present invention also contemplates combination of coir pith with non-coir/non-peat inorganic materials of the type typically used in horticultural applications. Examples of such inorganics are vermiculate; lavalite, wollastonite; calcined earth; expanded clay, expanded shale, rock wool, pumice, plastics such as foamed polystyrene, styromull, hygromull, plastic bristles; volcanic ash, pumice, volcanic glass, sand, gravel, glass beads, and the like, as well as any of the inorganic nutrients that have heretofore been recognized as important or essential for plant growth. For examples of nutrient and non-nutrient inorganics that may be used in the present invention's compressed coir blends, reference may be had to the so-called "soilless" growth medium described in U.S. Pat. No. 6,074,988, the disclosure of which is incorporated herein by reference.

It should be understood that in the compressed mixtures of the present invention, the non-coir/non-peat component may be all organic, all inorganic or a combination of organic and inorganic ingredients.

In the process of the present invention, compressed bricks of coir pith and compressed bales or bricks of non-coir/non-peat materials are subjected to an initial decompression step to provide separate decompressed or fluffed quantities of these materials although at least a portion of this decompression step may be avoided by employing already decompressed starting materials, if such materials are available. However, regardless of the source of the decompressed coir pith and/or non-coir/non-peat material, in the process of the present invention these decompressed raw materials are mixed together to form a blended product.

A significant advantage of the present invention is the ability to formulate coir pith compressed blends in which the non-coir/non-peat component thereof may based on materials which are obtained locally or regionally.

The decompressed coir pith to be mixed with the decompressed non-coir/non-peat organics and/or inorganics should be relatively dry and have a moisture content less than about 25% and, preferably, in a range of about 15–20%. Without intending to be bound by a theory of operation for the invention, we believe that the ability to attain greater than expected fluff yields from the blended ingredients. of the invention is based on the ability of moisture to transfer from the non-coir/non-peat ingredients to the coir. For example, we have discovered that, generally speaking, the greatest enhancement in fluff yield (i.e., the greatest increase in volume between the sum of the initial separate, decompressed starting volumes of coir and non-coir/non-peat ingredients, and the final decompressed volume of the mixture thereof) can be achieved when the moisture content of the non-coir/non-peat ingredient(s) is/are adjusted from ambient moisture to the highest possible moisture content for that material.

The terminology "highest possible moisture content" as used herein is intended to mean the highest moisture content of the separate, decompressed non-coir/non-peat ingredients at which a 1:1 volume mixture thereof with decompressed coir of given moisture can be compressed, at a compression ratio of 1.5 to about 2.5, with essentially no release or loss of liquid water. Each selected non-coir/non-peat material will exhibit its own characteristic "highest possible moisture content" for purposes of the present invention, and persons skilled in the art will be readily able to determine that content empirically without undue experimentation. For example, when a combination of coir pith having the required moisture content of less than 25% is combined on a 1:1 volume basis with a decompressed non-coir/non-peat additive such that compression anywhere within the range of about 1.5 to about 2.5 to 1 results in a visible release or separation of water from the blend while under compression (i.e., analogous to water dripping or escaping from a squeezed sponge) then the moisture content of the non-coir/non-peat moss component should be understood to have exceeded the highest possible moisture content for the specific coir blend in question.

While it is preferred within the practice of the present invention that the moisture content of the selected non coir-based ingredients be adjusted to the "highest possible moisture content," as defined above, it should be recognized that fluff yield enhancements may be attainable even when lower moisture contents are employed in the non-coir/non-peat ingredient. Accordingly, for purposes of the present invention, the moisture content of the non coir-based ingredients must be high enough so that upon compression of an initial non-compressed volume of coconut coir pith and an initial non-compressed volume of the selected non-coir/non-peat material to produce a compressed blend and subsequent decompression thereof, the resulting total volume of the final decompressed or fluffed mixture of coir pith and non-coir/non-peat material exceeds the sum of the initial non-compressed volumes of the coir pith and the selected non-coir/non-peat material which are admixed to form the blend. In other words, a final volume of decompressed or fluffed product is produced which is greater than the initial combined volumes of the coir pith and non-coir/non-peat materials employed to form the blend.

Depending upon the nature of the non-coir/non-peat material selected, the desired fluff yield of the present invention may or may not require adjustment in the ambient moisture content of the decompressed non-coir/non-peat ingredient.

Generally speaking, the "highest possible moisture" content of the non coir-based ingredients of the blend for purposes of the present invention may be as low as about 20%, or even lower, for relatively non-absorbent materials such as sand, and perhaps as high as 40 to 60%, or even higher, for more absorbent materials such as composted pine bark, composted manure, yard compost, and peat humus. Examples of preferred moisture contents (by weight) for various non-coir/non-peat ingredients suitable in the invention are as follows: yard compost preferably should be in a range of about 40 to about 50 percent, and most preferably about 45 percent; composted pine park preferably should be in a range of about 55 to about 65 percent, and most preferably about 60 percent; composted manure preferably should be in a range of about 50 to about 60 percent, and most preferably about 55 percent; composted peat moss (i.e., "peat humus") preferably should be in a range of about 45 to about 55 percent, and most preferably about 50 percent; and sand preferably should be in a range of about 15 to about 25 percent, and most preferably about 20%. It should be understood that the highest possible water content for purposes of the invention can vary slightly depending upon regional differences in the types of materials discussed herein.

The amount (by volume) of coir pith to be admixed to form the blend with the selected non-coir/non-peat ingredient(s) should range from about 95% to about 5% of the total volume of the blend while the selected non-coir/non-peat ingredient(s) should be present in an amount ranging from about 5% to about 95% of the total volume of the blend, although it is preferred to mix equal volumes of the coir pith and non-coir/non-peat based additives in forming the blend.

In a preferred embodiment of this invention, after a non-compressed blend of coir and selected non-coir/non-peat ingredients is prepared, the resulting mixture is compressed at a ratio ranging from about 1.5:1 (v/v) to about 2.5:1 (v/v) in order to provide a desired compressed blend suitable for shipment and sale as a baled product. Then, the compressed blend may be subjected to a final decompression step (e.g., by an end user) in order to provide a fluffed mixture of coir pith and non-coir/non-peat ingredients at a greater than anticipated fluff yield rate. In many instances the compressed blend also exhibits a decreased outturn time compared with coir compressed by itself, or compared with the non-coir/non-peat material compressed by itself.

Although the compressed blends of the present invention are preferably free of peat moss, it is also contemplated that the blends may comprise, as a third and optional component, various types of peat moss such as hypnum, sphagnum and/or sledge peat in order to modify the overall processing and/or performance of the blend.

The following examples are provided to illustrate preferred embodiments of the coir pith blends of the invention, the preferred method of preparation and comparative evaluations with prior art compositions.

EXAMPLE 1

This Example demonstrates that the fluffed yield of an uncombined, unblended coir pith sample decreases when the sample is subjected to compression followed by decompression. This Example further demonstrates that the fluffed yield of various uncombined, unblended samples of non-coir/non-peat materials is unchanged when the samples, likewise, are subjected to compression followed by decompression.

The test sample of coir pith was prepared by initially decompressing standard coir pith bricks compressed at a ratio of 5:1 (v/v) using standard coir pith outturning equipment to provide a fluffed material. Then, 1 part fluffed coir pith having a moisture content of 20% was mixed by hand in a 5 liter covered container with one equal part by volume of the same fluffed coir material also having a moisture content of 20%, resulting in a two unit volume total of fluffed coir. The container was shaken by hand until the components were thoroughly mixed. The resulting sample containing 2.0 unit volumes of non-compressed coir pith was then placed in a 30.8 cm tall by 7.6 cm wide cylinder and the sample was compressed by hand to a compression ratio of 2:1 (v/v) so that the compressed sample had a unit volume of 1.0. Then, the compressed coir pith sample was decompressed, thoroughly mixed and the resulting volume was determined and tabulated in Table 1.

Further test samples of various organic and inorganic non-coir/non-peat ingredients (i.e., aged pine bark, composted manure, yard compost, peat humus and sand) also were prepared by initially screening the ingredients through a one-half inch screen to remove oversized material and to provide fluffed (i.e., non-compressed) materials, where applicable. Initial moisture content for each material was determined and about two equal volumes of each of the non-coir/non-peat ingredients were mixed together in the same manner as the coir pith sample. Each approximately two unit volume sample of non-coir/non-peat ingredients was then placed in a 30.8 cm tall by 7.6 cm wide cylinder and each sample was compressed by hand to a compression ratio as close to 2:1 (v/v) as possible. Then, each of these compressed mixtures was decompressed, thoroughly mixed and the volume yields were determined.

The results of this testing which represent the mean yields of three replications each after separate compression and decompression treatments of the coir pith and the selected non-coir/non-peat materials are set forth in Table 1 below.

TABLE 1

| Component | Moisture Content w/w | Yield before mixing | Yield after mixing (and after compression) | Yield after decompression of the compressed mixture |
|---|---|---|---|---|
| Coir Pith | 20% | 2.0 | 2.0 (1.0) | 1.88 |
| Yard Waste Compost | 35% | 2.0 | 2.1 (1.1) | 2.0 |
| Composted Pine Bark | 18% | 2.0 | 2.0 (1.1) | 2.0 |
| Composted Manure | 60% | 2.0 | 2.0 (1.1) | 2.0 |
| Sand | 18% | 2.0 | 2.0 (1.4) | 2.0 |
| Peat Humus | 43% | 2.0 | 2.0 (1.2) | 2.0 |

It should be noted that the tabulated test results in Table 1 indicate that when 1 part of the fluffed, non-compressed coir is mixed with one equal part (by volume) of the same material, and the mixture is compressed 2:1 and then decompressed, a resultant volume yield loss of 6% is observed in comparison to the starting two-unit volume. The tabulated test results in Table 1 further indicate that when 1 part of any one of a variety of fluffed, non-compressed non-coir/non-peat materials is mixed with one equal part (by volume) of the same material, and the mixture is compressed 2:1 and then decompressed, the resultant volume yield of decompressed product in each case exhibits no increase from the original two unit starting volume.

EXAMPLE 2

Non-compressed coconut coir pith at a moisture content of 19.4% was combined in equal volumes with non-compressed yard waste compost, composted pine bark (0 to ⅜"), composted-manure, sand and peat humus (from Shreve, Ohio). To increase the uniformity of the composted yard waste, composted manure and peat humus, only material that passed through a No. 5 screen (4 mm) was used. Initial moisture contents for each material were determined and adjusted to the highest moisture content possible for that material as defined herein (see Table 2). Volumes were determined by pouring the material into a 347.5 cm³ cylinder and scraping off the excess material to the top of the cylinder. Combinations were then mixed thoroughly by hand in a bucket for 30 to 40 seconds. The volume of the combination of the non-compressed ingredients was then determined by measuring the, number of 347.5 cm³ cylinders (or fraction of a cylinder) that could be filled. In each case, the mixture was then placed into a 30.8 cm tall by 7.6 cm wide cylinder and compressed by hand. The volume of the resulting compressed mixture was then determined. The mixture was decompressed, thoroughly mixed and the volume was again determined. Results are presented in Table 2, below, in units of 347.5 cm³ (i.e., 1 unit=347.5 cm³).

TABLE 2

| 1 unit of coir was mixed with 1 unit of . . . | Initial Moisture Content w/w | Adjusted Moisture Content w/w | Yield by volume before mixing | Yield by volume after mixing (and after compression) | Yield by volume after decompression of the compressed mixture |
|---|---|---|---|---|---|
| Yard Waste Compost | 32% | 45% | 2.0 | 2.6 (1.4) | 2.7 |
| Composted Pine Bark | 53% | 60% | 2.0 | 2.3 (1.3) | 2.5 |
| Composted Manure | 47% | 55% | 2.0 | 2.3 (1.3) | 2.6 |
| Sand | 1% | 20% | 2.0 | 3.3 (1.8) | 3.2 |
| Peat Humus | 42% | 50% | 2.0 | 2.6 (1.5) | 2.5 |

The data in Table 2 demonstrates that all of the non-coir/non-peat materials tested, when mixed with coconut coir pith on a 1:1 unit volume basis, yielded greater than the expected two volumes after compression-and decompression, as was also the case for the combination of coir and peat moss which is the subject of commonly assigned U.S. Ser. No. 09/026,639. Thus, the tabulated results demonstrate that combining coir with non-coir/non-peat ingredients (organic and/or inorganic) to form an admixture, followed by compression of the admixture to form a blend and subsequent decompression of the blend, results in a final mixture of decompressed coir pith and decompressed non-coir/non-peat material having a greater than expected volume yield, i.e., a volume which exceeds the sum of the initial non-compressed volumes of coconut coir pith and non-coir/non-peat material in the admixture.

This is particularly surprising in view of the data shown in Table 1 in which no admixtures are formed and wherein compression and decompression of the coir sample resulted in a loss of total volume yield relative to the initial non-compressed volume of coconut coir pith in the sample and, furthermore, wherein compression and decompression of each of the non-coir/non-peat samples resulted in no change at all in the total volume yield relative to the initial non-compressed volume of non-coir/non-peat material in the samples.

Although the invention has been described in its preferred forms with a certain degree of particularity, it is to be understood that the present disclosure has been made by way of example only. Numerous changes in the details of the compositions and in the operational steps of the processes and in the materials utilized therein will be apparent without departing from the spirit and scope of the invention, as defined in the appended claims.

We claim:

1. A composition comprising a compressed blend of coconut coir pith and a non-coir/non-peat material, the compressed blend is formed from an admixture consisting essentially of an initial non-compressed volume of coconut coir pith and an initial non-compressed volume of a horticulturally acceptable non-coir/non-peat material, the moisture content of the coconut coir pith in the admixture is less than about 25 weight percent and the moisture content of the non-coir/non-peat material in the admixture is sufficient to enable. the admixture to be compressed to form the compressed blend in a manner such that, upon decompression of the compressed blend, a total volume of decompressed coir pith and decompressed non-coir/non-peat material is produced which exceeds the sum of the initial non-compressed volumes of coconut coir pith and non-coir/non-peat material in the admixture.

2. The compressed blend of claim 1 wherein the non-coir/non-peat material is selected from the group consisting of composted yard waste; composted bark; composted manure; sand; peat humus; composted agricultural waste; composted animal byproducts; treated sewage sludge; animal and/or vegetable-based landfill waste; wood and lignocellulose derivatives; vermiculite; perlite, glass beads; foamed plastics, and mixtures thereof.

3. The composition of claim 1 wherein the coconut coir pith in the admixture is a decompressed form of coconut coir pith and the non-coir/non-peat material in the admixture is a decompressed form of the non-coir/non-peat material.

4. The composition of claim 1 wherein the moisture content of the non-compressed coconut coir pith is in the range of about 15 percent to about 20 percent.

5. The composition of claim 4 wherein the moisture content of the non-compressed non-coir/non-peat material in the admixture is adjusted to the highest level sufficient to form the compressed blend which, upon decompression of the compressed blend, produces the total volume of decompressed coir pith and decompressed non-coir/non-peat material exceeding the sum of the initial non-compressed volumes of coconut coir pith and non-coir/non-peat material in the admixture.

6. The composition of claim 4 wherein the coconut coir pith comprises particles in the size range of about 0.2–2.0 mm.

7. The composition of claim 1 wherein the amount by volume of coconut coir pith in the admixture is about 95 percent to about 5 percent and the amount by volume of non-coir/non-peat material in the admixture is about 5 percent to about 95 percent.

8. The composition of claim 7 wherein equal volumes of coconut coir pith and non-coir/non-peat material are blended in the admixture.

9. A process for producing a compressed blend of coconut coir pith and non-coir/non-peat material, comprising:
providing an initial non-compressed volume of coconut coir pith haying a moisture content of less than 25 weight percent;
providing an initial non-compressed volume of a horticulturally acceptable non-coir/non-peat material,
admixing the initial non-compressed volume of coconut coir pith and the initial non-compressed volume of non-coir/non-peat material to provide a blend of the coconut coir pith and the non-coir/non-peat material; and
subjecting the blend to a compression step to form a compressed blend of the coir pith and non-coir/non-peat material;
the moisture content of the initial. non-compressed non-coir/non-peat material incorporated in the blend, is sufficient to enable formation of the compressed blend in a manner such that, upon decompression of the compressed blend, a mixture of the coir pith and the non-coir/non-peat material is produced having a total volume which exceeds the sum of the initial non-compressed volumes of coconut coir pith and non-coir/non-peat material in the admixture.

10. The process of claim 9 wherein the non-coir/non-peat material comprises at least one member selected from the group consisting of composted yard waste; composted bark; composted manure; sand; peat humus; composted agricultural waste; composted animal byproducts; treated sewage sludge; animal and/or vegetable-based landfill waste; wood and lignocellulose derivatives; vermiculite; perlite, glass beads; foamed plastics, and mixtures thereof.

11. The process of claim 9 wherein the initial non-compressed volume of coconut coir pith is produced by subjecting compressed bricks of coconut coir pith to a decompression step.

12. The process of claim 11 wherein the coconut coir pith in the compressed bricks has a moisture content of about 20 percent by weight and is compressed at a ratio of at least 5:1 v/v.

13. The process of claim 9 wherein the initial non-compressed volume of non-coir/non-peat material is produced by subjecting compressed quantities of the non-coir/non-peat material to a decompression step.

14. The process of claim 9 further including the step of subjecting the compressed blend of the coir pith and the non-coir/non-peat material to a final decompression step in order to provide a fluffed or outturned mixture of coconut coir pith and non-coir/non-peat material having a volume which exceeds the sum of the initial non-compressed volumes of coconut coir pith and non-coir/non-peat material in the admixture.

15. The process of claim 9 wherein the blend is compressed at a ratio ranging from about 1.5:1 v/v to about 2.5:1 v/v.

16. The process of claim 15 wherein the non-coir/non-peat material is selected from the group consisting of composted yard waste; composted bark; composted manure; sand; peat humus; composted agricultural waste; composted animal byproducts; treated sewage sludge; animal and/or vegetable-based landfill waste; wood and lignocellulose derivatives; vermiculite; perlite, glass beads; foamed plastics, and mixtures thereof and wherein each of the non-coir/non-peat materials is adjusted to the highest possible moisture content.

17. The process of claim 9 wherein the non-coir/non-peat material is screened to remove oversize particles prior to admixing with coconut coir pith and the, blend of coconut coir pith and non-coir material is compressed at a ratio from about 1S to about 2.5:1 v/v.

18. The process of claim 17 wherein the moisture content of the non-coir/non-peat material in the blend is adjusted to the highest possible moisture content for that material.

19. The process of claim 9 wherein the non-compressed coconut coir pith in the blend has a moisture content ranging from about 15 percent to about 20 percent by weight.

20. The process of claim 9 wherein the amount by volume of the initial volume of non-compressed coconut coir pith in the blend is in a range of about 95 percent to about 5 percent and the amount by volume of said non-compressed non-coir/non-peat material is in the range of about 5 percent to about 95 percent.

21. The process of claim 20 wherein the initial volume of non-compressed coconut coir pith in the blend is equal to the initial volume of non-compressed non-coir/non-peat material in the blend.

22. A composition comprising a compressed blend of an initial volume of coconut coir pith and an initial volume of a horticulturally acceptable non-coir/non-peat material; the compressed blend being formed in a manner such that when the compressed blend is fluffed or outturned, a fluff yield of decompressed coconut coir pith and non-coir/non-peat material is produced which exceeds the sum of the initial volumes of the coconut coir pith and non-coir/non-peat material in the blend.

23. The composition of claim 22, wherein the non-coir/non-peat material is selected from the group consisting of composted yard waste; composted bark; composted manure; sand; peat humus; composted agricultural waste; composted animal byproducts; treated sewage sludge; animal and/or vegetable-based landfill waste; wood and lignocellulose derivatives; vermiculite; perlite, glass beads; foamed plastics, and mixtures thereof.

24. The composition of claim 23 wherein the coir pith has a moisture content of less than about 25 percent by weight and the non-coir/non-peat material is composted yard waste.

25. The composition of claim 24 wherein the moisture content of the composted yard waste is about 45 percent by weight.

26. The composition of claim 24 wherein the moisture content of the sand is about 20 percent by weight.

27. The composition of claim 24 wherein the moisture content of the peat humus is about 50 percent by weight.

28. The composition of claim 23 wherein the coir pith has a moisture content of less than about 25 percent by weight and the non-coir/non-peat material is composted pine bark.

29. The composition of claim 28 wherein the moisture content of the composted pine bark is about 60 percent by weight.

30. The composition of claim 23 wherein the coir pith has a moisture content of less than about 25 percent by weight and the non-coir/non-peat material is composted manure.

31. The composition of claim 30 wherein the moisture content of the composted manure is about 55 percent by weight.

32. The composition of claim 23 wherein the coir pith has a moisture content of less than about 25 percent by weight and the non-coir/non-peat material is sand.

33. The composition of claim 23 wherein the coir pith has a moisture content of less than about 25 percent by weight and the non-coir/non-peat material is peat humus.

34. The composition of claim 22 wherein the coconut coir pith in the compressed blend has a moisture content of less than about 25 weight percent.

35. The composition of claim 34 wherein the non-coir/non-peat material in the compressed blend has a moisture content that is adjusted to the highest possible moisture content for that material.

36. The composition of claim 22 wherein the initial volumes of coir pith and non-coir/non-peat materials in the blend are compressed at a ratio from about 1.5 to about 2.5:1 v/v.

37. The composition of claim 36 wherein the initial volume of coconut coir pith in the blend is in a range of about 95 percent to about 5 percent of the total volume of the blend and the initial volume of the non-coir/non-peat material in the blend is in a range of about 5 percent to about 95 percent of the total volume of the blend.

* * * * *

UNITED STATES PATENT AND TRADEMARK OFFICE
CERTIFICATE OF CORRECTION

PATENT NO.    : 6,408,568 B1                                                      Page 1 of 1
DATED         : June 25, 2002
INVENTOR(S)   : William E. Kusey et al.

It is certified that error appears in the above-identified patent and that said Letters Patent is hereby corrected as shown below:

Title page, Item [54] and Column 1, line 2,
Delete "A" between "AND" and "NON-COIR".

Column 12,
Line 53, delete the comma between "the" and "blend"
Line 55, change "1S" to -- 1.5 --.

Signed and Sealed this

Sixth Day of January, 2004

JAMES E. ROGAN
*Director of the United States Patent and Trademark Office*